Oct. 27, 1970 R. HUBRICH ET AL 3,537,046

SERIES KEY WITHOUT CONTACT

Filed Dec. 2, 1968

Jnventors

Rudolf Hubrich
Josef Peffer attorney

United States Patent Office 3,537,046
Patented Oct. 27, 1970

3,537,046

SERIES KEY WITHOUT CONTACT

Rudolf Hubrich, Ravensburg, and Josef Pfeffer, Amtszell, near Wangen, Germany, assignors to Rafi Raimund Finsterholzl Elektrotechnische Spezialfabrik, Ravensburg, Germany, a corporation of Germany Filed Dec. 2, 1968, Ser. No. 780,497
Claims priority, application Germany, Dec. 1, 1967, 1,537,314
Int. Cl. H01h 9/00
U.S. Cl. 335—1 5 Claims

ABSTRACT OF THE DISCLOSURE

A non-contacting series key for the generation of electronic control impulses, particularly for feeding devices of data processing, as well as for industry- and tool machine-controls, which comprises a housing having a bore, and a permanent magnet block defining a magnetic field disposed in said housing and including an upper pole shoe which has a knife edge. A plurality of switching sweeps are supported by the knife edge and one of the switching sweeps is coordinated to each of the keys including an operating pin, extending through the bore. At least one field plate carries electric current and is connected with an output clamp. The switching sweeps are movable relative to the field plate, and the switching sweeps are of ferromagnetic material and are swingably mounted on the upper pole shoe of the permanent magnet.

Figure 2:
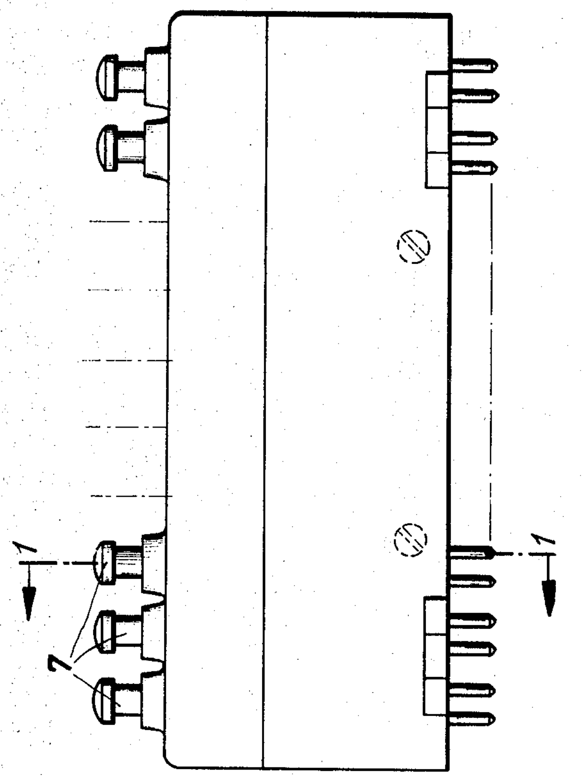

The present invention relates to a non-contacting series key in general, and to such non-contacting series keys adapted for the generation of electronic control impulses, particularly for input devices of electronic data processing, as well as for industry- and tool machine-controls.

Such non-contacting series keys have essential advantages compared with those in which for the release of an electric function mechanical contacts are necessary. These advantages result from the following characteristics: shock-free contacts, long life, constant transfer resistance, non-sensitivity against external influences (humidity and vibration), high switching frequency and low operating force. Such devices are thus particularly suitable for a high switching frequency and great switching security, as it is desired from series keys.

In the known non-contacting electronic pressure keys an oscillator swinging in the non-switching state serves, for example, as impulse sender, the oscillations of the oscillator being inductively or capacitively dampened, in order to release a switching process. Such systems, however, have the drawback of a great requirement of structural and screening elements. In addition they require a supply tension and are very sensitive against temperature. For the use in key arrangements with a mechanical locking device in which the operating space is very limited, and in which a standard, comparatively small key division (International 4.75 m./m.) must be maintained, such switching elements are therefore not suitable or only conditionally suitable.

In order, however, to be able to use the advantages of a non-contacting generation of electronic control impulses also in series key arrangements, without the necessity of taking in stride the drawbacks of the old structures, it is one object of the present invention to provide a series key for the generation of electronic control impulses, in which at least one switching sweep is assigned to each key, which switching sweep is movable in a magnetic field relative to at least one field plate carrying electric current and connected to the output clamp, whereby a sweep consisting of ferromagnetic material is swingably mounted at the pole shoe of a permanent magnet.

In this case, use is made of the characteristic of the field plate as a semi-conductor structural element, whereupon its ohmic resistance increases in the magnetic field. The present invention renders possible in an advantageous manner the exploitation of this effect in series key arrangements with simple and little space requiring means without wear.

It is another object of the present invention to provide a non-contacting series key as a further development of the present invention, wherein the sweep is formed as an angular member, which is mounted with its inner edge on a knife edge of the pole shoe, whereby the one sweep arm collaborates with the operating rod of the key arrangement, and the other arm is brought into the rest position by the magnet and is there retained. By this arrangement, a structure of the individual key element results, in which the moved masses are very light and no elements likely to lead to disturbances are used. A simplification is also brought about such, that the permanent magnet is simultaneously used to put the sweep during each switching process into the rest position and, if desired, to retain same in this position.

Since the field plates can be formed very small, several field plates may be provided without difficulty with one sweep, whereby then by corresponding arrangement multiple and selective switchings, respectively, can be performed.

In accordance with the present invention, an insulating member is provided on the upper pole shoe, which insulating member is arranged such, that the magnetic effect surmounts the other sweep arm. By this arrangement a safe return position of the sweep and thereby of the key element into the rest position is assured.

One could equip each key element with a particular permanent magnet and align the individual magnet with uniform poling. However, in order to simplify the mounting and to bring about a better effect by means of larger magnet mass, a joint magnet block is provided in accordance with the present invention for all sweeps.

Figure 1:
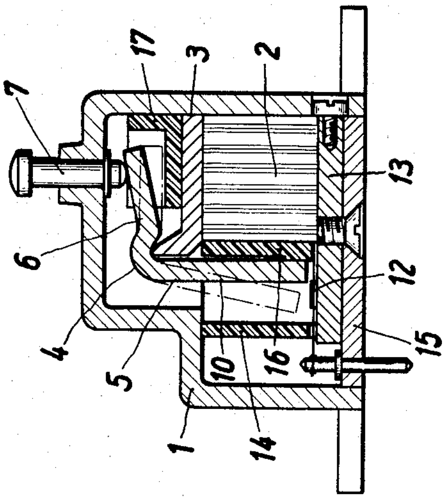

With these and other objects in view, which will become apparent in the following detailed description, the present invention can be clearly understood in connection with the accompanying drawing, in which:

FIG. 1 is a section along the lines 1—1 of a non-contacting series key of FIG. 2; and FIG. 2 is a front elevation of the non-contacting series key.

Referring now to the drawing, the non-contacting series key comprises a renewable housing 1, in which a permanent magnet block 2 is disposed. The latter has an upper pole shoe 3 with a knife edge 4, on which knife edge 4 at least one switching sweep 5 supports itself swingably. The upper leg 6 of the angular sweep supports itself on the operating pin 7. The lower sweep leg arm 10 is, in case of release of the operating pin 7, put into the shown resting position by the magnetic force and retained in that position.

Within the range of the magnet field, preferably in the vicinity of the magnet 2, a field plate 12 is coordinated to each switching sweep 5, which field plate 12 is secured to the lower pole shoe 13 by the member 14, and which can be connected to an electric circuit by means of the connecting plate 15.

If the operating pin 7 is pushed down, the corresponding switching sweep 5 is brought into the point-dotted line position, whereby the magnetic field is deflected, so that the ohmic resistance of the field plate is changed. Upon release of the pin 7, the switching sweep 5 and its arm 10, respectively, is brought again into the starting position by the magnet and is retained there. This holding effect can be adjusted to the particular circumstances by a correspondingly dimensioned insulating mediate plate 16.

The insulating support 17 on the upper pole shoe 3 serves a similar purpose. With this support, the pulling force of the magnet exerted upon the sweep arm 6 can be adjusted to the pulling force exerted on the arm 10, so that the latter is overbalanced by all means.

As can be ascertained from FIG. 2, the described non-contacting switching system is particularly suitable in a selectively long series, whereby the prescribed standard of 4.75 m./m. can be maintained without difficulty.

While I have disclosed one embodiment of the present invention, it is to be understood that this embodiment is given by example only and not in a limiting sense.

We claim:

1. A non-contacting series key for the generation of electronic control impulses, particularly for feeding devices of the data processing, as well as for industry- and tool machine-controls, comprising:

a housing, a magnet defining a magnetic field, disposed in said housing and including a pole shoe having a knife edge, at least one switching sweep being supported by said knife edge, at least one key including an operating pin mounted on said housing, said switching sweep being coordinated to said at least one key, an output on said housing, at least one field plate carrying electric current and connected with said output and adapted for changing its electrical characteristic when in different magnetic fields, said switching sweep being disposed movable relative to said at least one field plate so as to apply different magnetic fields to the latter, and said switching sweep being of ferromagnetic material and swingably mounted on said pole shoe of said magnet.

2. The non-contacting series key, as set forth in claim 1, wherein said switching sweeps are angular members which define two arms and are mounted at their inner corner on said knife edge of said pole shoe, and one of said arms of said switching sweeps cooperating with said operating pin and the other of said arms is put into its rest position by said magnet and retained in said position.

3. The non-contacting series key, as set forth in claim 2, which includes an insulation support provided on said pole shoe, and said insulation support is arranged such, that the magnetic effect is preponderant on said other of said arms.

4. The non-contacting series key, as set forth in claim 1, wherein:

said magnet operates all of said switching sweeps.

5. The non-contacting series key, as set forth in claim 1, which includes:

a plurality of said switching sweeps, and one of said switching sweeps is coordinated to each of said at least one key.

References Cited

UNITED STATES PATENTS 3,286,161 11/1966 Jones.
3,373,391 3/1968 Bohm.

BERNARD A. GILHEANY, Primary Examiner

H. BROOME, Assistant Examiner

U.S. Cl. X.R.

335—207; 323—94